United States Patent [19]
Rathburn

[11] 3,834,811
[45] Sept. 10, 1974

[54] GRAPHIC ARTS CAMERA

[75] Inventor: Paul Rathburn, Miami, Fla.

[73] Assignee: Craft Camera Corp., Opa Locka, Fla.

[22] Filed: June 20, 1973

[21] Appl. No.: 371,669

[52] U.S. Cl. ............... 355/18, 355/39, 355/60, 355/66, 355/73
[51] Int. Cl.. G03b 27/32, G03b 27/60, G03b 27/70
[58] Field of Search................... 355/18, 39, 55–60, 355/66, 73

[56] References Cited
UNITED STATES PATENTS

| | | | |
|---|---|---|---|
| 2,585,927 | 1/1952 | Gelb | 355/55 X |
| 3,207,030 | 9/1965 | Polland | 355/60 |
| 3,424,530 | 1/1969 | Leonhart | 355/18 X |
| 3,639,054 | 1/1972 | Wally, Jr. | 355/18 |
| 3,666,366 | 5/1972 | Keeble et al. | 355/60 X |
| 3,690,761 | 9/1972 | Green | 355/66 X |
| 3,724,948 | 4/1973 | Wally, Jr. et al. | 355/55 |

Primary Examiner—Richard A. Wintercorn
Attorney, Agent, or Firm—Paul M. Pahules

[57] ABSTRACT

A graphic arts camera constructed according to the present invention includes a copyboard, lens with bellows, a film holder and a light image reflector disposed in vertically extending parallel planes and spaced longitudinally apart. The film holder and the light image reflector are pivotally mounted on frames having rollers engaging a pair of overhead tracks for traveling thereon. The film holder is adapted to be adjustably positioned from its parallel wrong reading position with respect to the copyboard and lens to an angular right reading position thereto in conjunction with the light image reflector also adjustably positioned angularly with respect thereto for reflecting the light image of the subject copy from the copyboard through the lens on the film mounted on the film holder for a right reading shot. The copyboard is also provided with a drop down door for loading film when being used for back lighting or projection.

8 Claims, 11 Drawing Figures

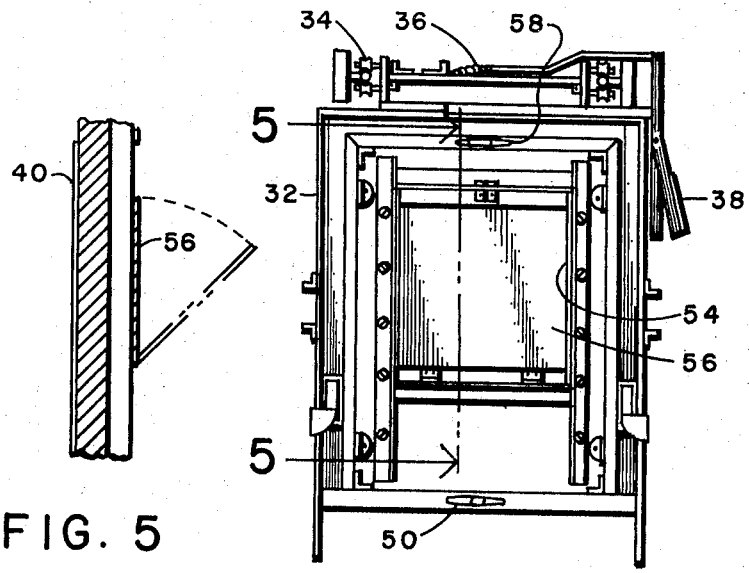
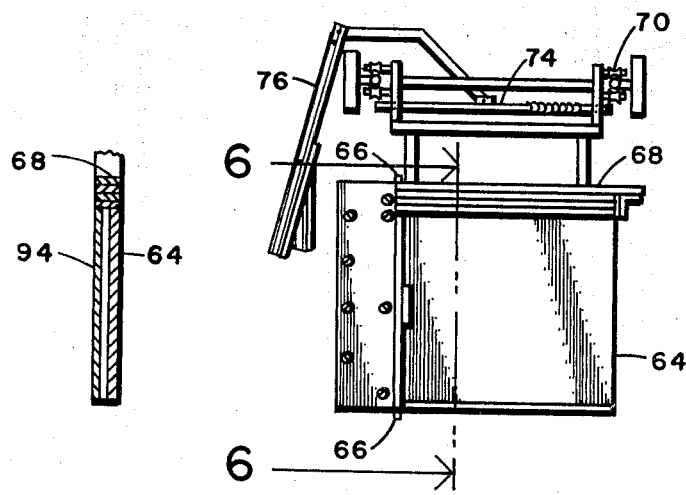

GRAPHIC ARTS CAMERA

This invention relates to a graphic arts camera and more particularly to an improved photographic system of a horizontal and a vertical camera combined into one unit for selectively producing both right and wrong reading photographic copies of a graphic subject.

BACKGROUND OF THE INVENTION

In the graphic arts for photographically reproducing a subject, it has been the common practice, heretofore, to employ either a so-called horizontal photographic copying camera or a camera having a vertical system which, when provided with a prismatic head, produces right or correct reading copy.

SUMMARY OF THE INVENTION

The primary object of this invention is to provide an improved horizontal and vertical photographic camera combined into one unit which selectively produces both right and wrong reading copies in shots, stats, velox, halftones, film or peel apart paper, and which performs maximum reductions and enlargements.

A further object of the present invention is to provide a graphic arts photographic camera which may be switched from wrong reading image to right reading image or vice versa in a matter of seconds and which when used as wrong reading camera, it will produce shots on film or paper, especially, on peel apart paper, producing a positive print from a positive instead of the customary wrong reading negative producing a positive print when developing the print. The graphic arts camera of the present invention is also advantageously used for right reading prints in the use of paste up or lay out work in which a right reading negative is required. It may be used for screening on prints for wrong or right reading.

The graphic arts camera of the present invention may also be used as a stat camera, progress camera, enlarger, contact printer and trick or special effects camera. Furthermore, the camera of the present invention produces the type of photo desired with speed and with great accuracy at a minimum amount of cost of operation. It also may be reloaded with film when back lighting or projection is used and when several pieces of film or prints are required to be exactly the same with great accuracy. Reloading may be done without even moving the copyboard from its position by using the drop down door in the copyboard.

The use of the graphic arts camera of the present invention will become more obvious from the following description of the preferred embodiment and from the accompanying drawing.

BRIEF DESCRIPTION OF DRAWING

FIG. 3 is a sectional view taken along the line 3—3 of FIG. 2;

FIG. 4 is a sectional view taken along the line 4—4 of FIG. 2;

FIG. 5 is a sectional view taken along the line 5—5 of FIG. 3;

FIG. 6 is a sectional view taken along the line 6—6 of FIG. 4;

DESCRIPTION OF THE PREFERRED EMBODIMENT

Figure 1:
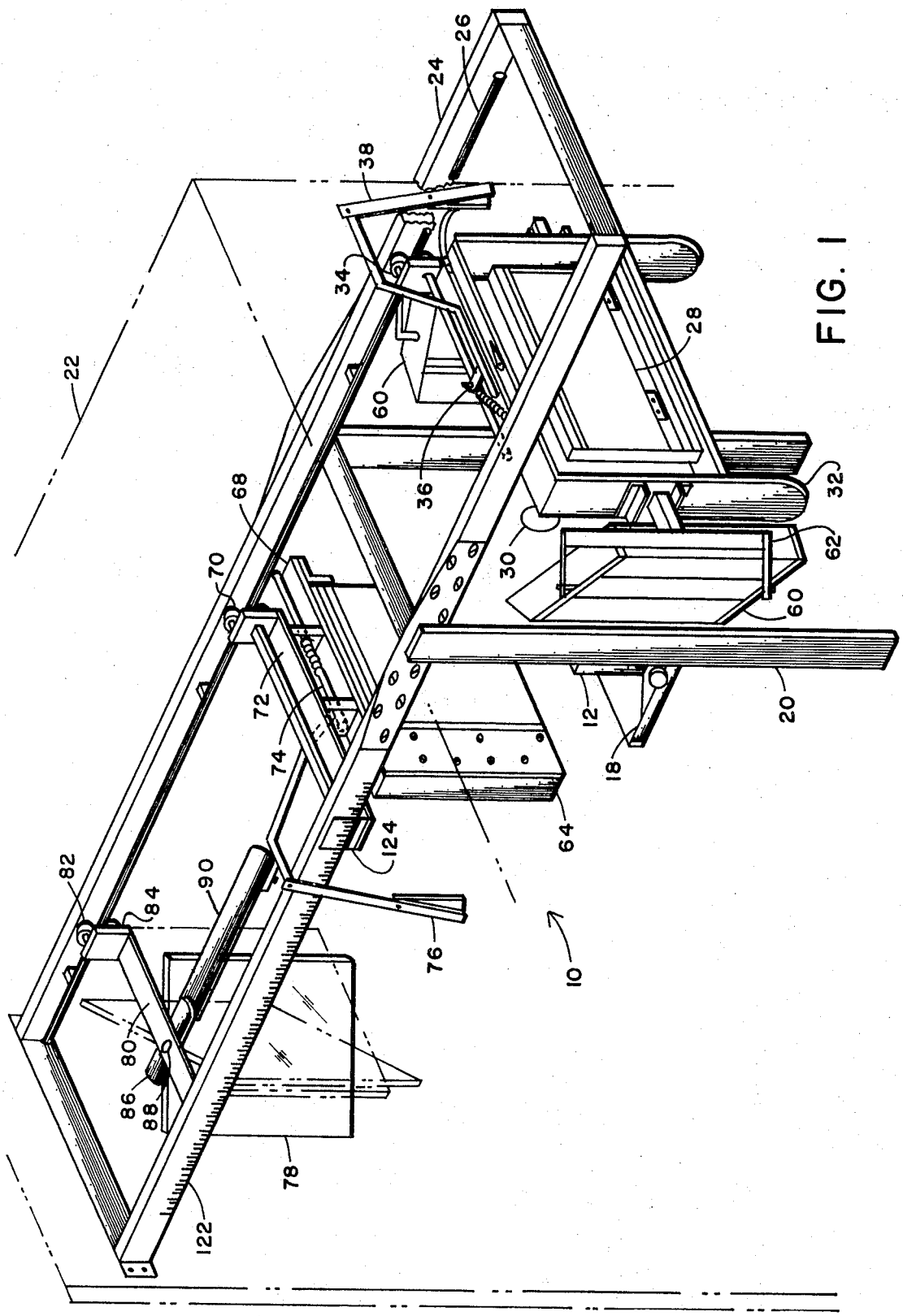
FIG. 1 is a perspective view of a graphic arts camera constructed in accordance with the present invention.

Referring now to the drawing in detail, the embodiment of the invention here illustrated is designated in general by numeral 10 and comprises a conventional camera assembly 12 having lens 14 enclosed with collapsible bellows 16 and mounted on supporting tracks 18 for adjustably sliding back and forth as it is well known in the art for focusing a light image reflected from a subject item to be copied. The lens 14 of the camera assembly 12 may be positioned forward or rearward of a wall 20, in this embodiment is shown to be positioned rearwardly, of a dark room as shown in phantom line and designated by numeral 22.

Figure 9:
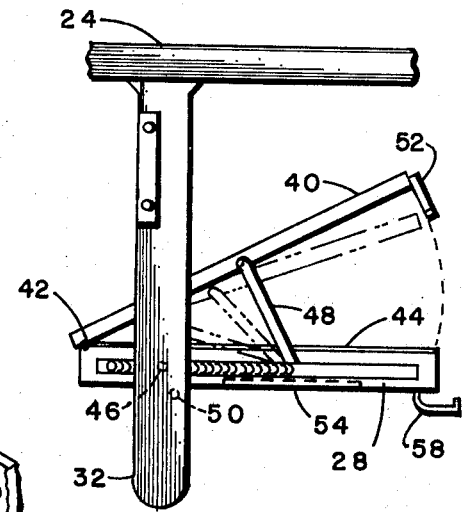
FIG. 9 is a fragmentary side elevational view of the copyboard of FIG. 3 illustrating the copyboard in a horizontal loading position.
Figure 10:
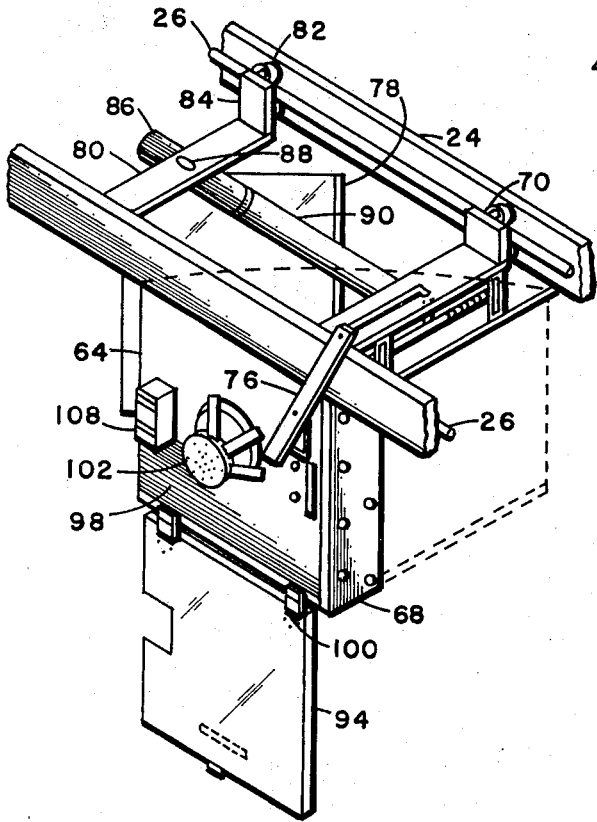
FIG. 10 is an enlarged fragmentary perspective view of the film holder of FIG. 4 illustrating the viewing glass in a down position.

In front of the camera lens 14, and outside of the dark room 22, there is mounted from an overhead frame 24 having side rails 26, a copyboard 28 disposed in a vertical plane in parallel relationship to the wall 20 and extending below the overhead frame 24 having side rails 26, a copyboard 28 disposed in a vertical plane in parallel relationship to the wall 20 and extending below the overhead frame 24 faces an opening 30 in the dark room wall 20 in allingment with the camera lens 14. The copyboard 28 includes a substantially rectangular supporting frame 32 provided with rollers 34 engaging the rails 26 for back and forth sliding movement of the copyboard 28 on the overhead frame 24. The rollers 34 may be provided with locking or breaking means 36 operated by a handle 38 for locking the copyboard 28 at a desired position on the overhead frame 24. The copyboard 28 is further provided with a transparent front panel 40, such as a glass, pivoted as at 42 on a back panel 44, also, pivotally mounted on the supporting frame 32; as by pivots, for being tilted to a horizontal loading position, as shown in FIG. 9. The transparent front panel 40 is supported in a raised position when the copyboard 28 is tilted in a horizontal loading position by pair of springload levers 48 adapted to slide along the sides of the back panel 44. Suitable stop means as shown at 50 may be provided on the frame 24 to support the back panel 44 in the horizontal position for loading the subject matter to be reproduced. The back panel 44 and the front panel 40 are provided with a latch 52 for locking together thereby securing the subject matter to be reproduced therebetween during exposure. The back panel 44 is further provided with a substantially rectangular back opening 54 and a drop down door 56 hinged, as at 58, thereto and adapted to be swung to an open horizontal position for loading, while the copyboard 28 is kept in the vertical position, with film when being used for back lighting or projection. The door 56 is locked to the panel 46 in a closed vertical position by a conventional latch 58 on the back panel 44. The drop door 56 may be of opal glass for protection or back lighting when shooting a film or when it is critical that all shots be made with a fine tolerance. In order to illuminate a subject matter to be copied and mounted on the copyboard 28, a pair of light reflectors 60 are hingedly mounted on the copyboard frame 32 one on each side thereof, as by adjustable arms 62, whereby the light reflectors 60 may adjustably be positioned with respect to the copyboard 28 for regular front lighting or for rear lighting when shooting through film. Mounted on the overhead frame 24, inside the dark room 22, there is a film holder or platen 64 of a substantially rectangular shape disposed in a vertical plane. The film holder 64 is pivotally mounted as by pivots 66, on a substantially L-shaped frame 68 and is provided with rollers 70. The L-shaped frame 68 is mounted on a supporting frame 72, to which the rollers 70 are attached for engaging the overhead frame side rails 26 for traveling back and forth thereon in adjusting the position thereof with respect to the camera lens 14. The film holder 64 is thus adapted to swing on pivots 66 from a parallel position facing the camera lens 14 for wrong reading shots to an angular position of about 90° with respect to the camera lens 14 for right reading shots. The film holder 64 is further provided with brake or locking means 74 operated by a handle 76, as of that of the copyboard 28, for locking the film holder 64 in position by engaging the overhead frame 24 thereby preventing movement thereof, as is well known in the art.

Mounted on the overhead frame 24 behind the film holder 64, there is a light image reflector 78 including a horizontally disposed and laterally extending frame 80, also provided with rollers 82 mounted on brackets 84 at the ends thereof and engaging the side rails 26 of the overhead frame for traveling thereon to adjustably be positioned lengthwise with respect to the film holder 64. The light image reflector 78 is pivotally mounted, as indicated at 88, at the center of the frame 80 by a bracket 86 extending horizontally, and parallel to the overhead frame 24. The light image reflector 78 is adapted to be turned to a desired angular position at about 45° for reflection of the light image of the item to be copied to the film holder 64 positioned at 90° with respect to the camera lens 14 for right reading shots. The film holder 64 and light image reflector 78 may be provided with interconnecting means 90 for being interlocked to a desired position by the locking means 74 of the film holder 64, so as to be moved in unison for proper setting.

Figure 7:
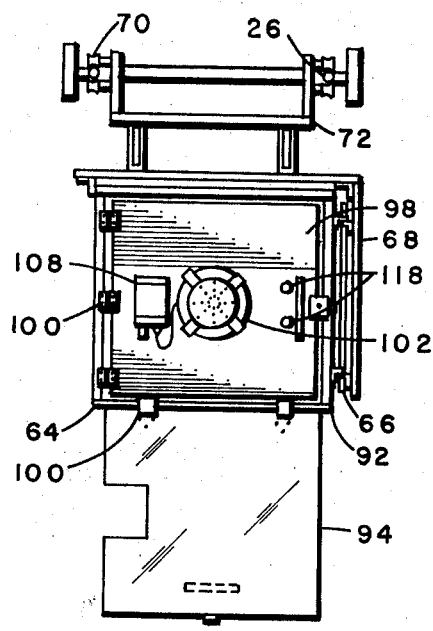
FIG. 7 is a sectional view taken along the line 7—7 of FIG. 2.
Figure 8:
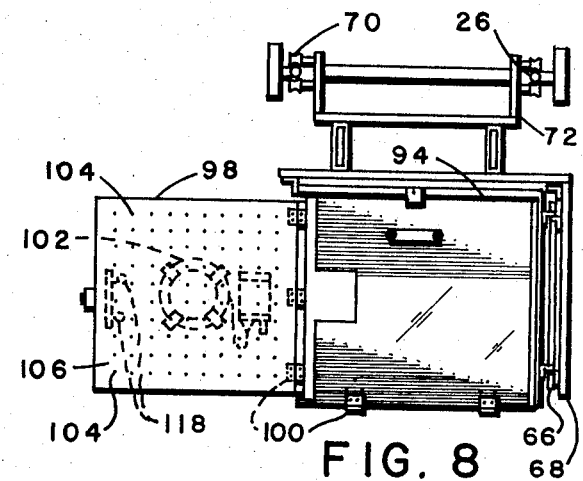
FIG. 8 is a sectional view similar to that of FIG. 7 with the vacuum back door shown in a side position.

As shown in FIGS. 7, 8 and 9 the film holder 64 consists of a substantially rectangular frame 92 mounted on the L-shaped frame 68 by the hinges 66, as stated above. A viewing glass 94 of a substantially rectangular shape is hinged to the frame 92, as at 96, for swinging in a down position when not in the up position for use. A vacuum back door 98 is hinged, as at 100, on the left vertical side of the frame 92 for swing out when the viewing glass 94 is in the up position. The viewing glass 94 and vacuum back door 98 are further provided with conventional latches for being locked in place. A vacuum pump 102 mounted on the back side of the door 98, is provided for creating a vacuum of low pressure by drawing air through perforation 104 in an inner side panel 106 of the door 98 thereby retaining a copy of the subject matter be copied firmly in position therebetween and against the inner side 106, as shown in FIG. 8. The vacuum pump 102 is controlled by a conventional variable speed control switch 108 mounted on the back door 98.

Figure 11:
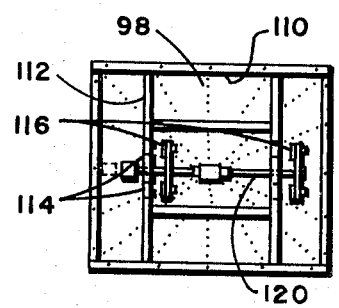
FIG. 11 is a side elevational view of the vacuum back panel of the film holder of FIGS. 7 and 8 illustrating the interior thereof.

As shown in FIG. 11, behind the perforated inner side panel 106, the vacuum back door 98, in the inner side thereof, is formed with plurality of substantially rectangular enclosures or compartment 110 having vertical side walls 112, the vertical side walls 112 are further provided with four holes 114 at the center section thereof, adapted to be opened and closed by plungers 116 operated by control knobs 118 connected thereby by control rods 120. The enclosures 110 are intended to be used when the copy of the subject matter to be copied is of a relatively small size and the whole surface of the perforated inner side panel 106 is not but only the center compartment is employed.

Since the vacuum pump 102 is located at the center of the back door 98, when the holes 114 are closed, the vacuum holding force is applied only on the surface of the inner side panel 106 outlined by the enclosure walls 112, thereby reducing the amount of low pressure required and the operating costs.

The camera 10 may also be provided with a measuring scale 122 mounted on the side of the overhead frame 24 for positioning the film holder 64 by a pointer 124, mounted thereon and the light image reflector 78 at exact distance therebetween and from the lens 14, as shown in FIG. 1.

Figure 2:
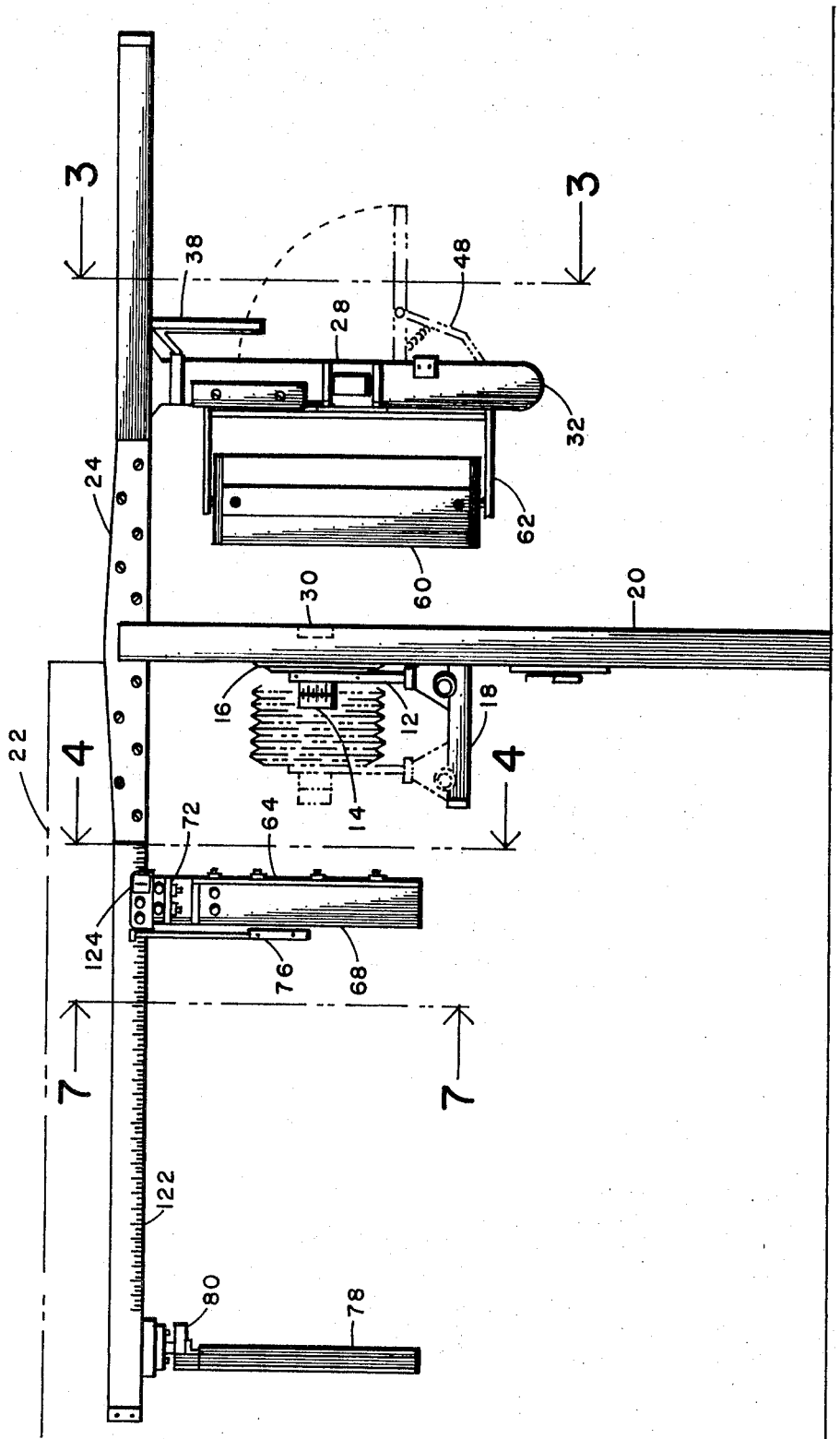
FIG. 2 is a side elevational view of the camera of FIG. 1.

In operation, the copyboard 28 is first loaded with the copy material to be reproduced by dropping the back panel 44 to its horizontal position, as shown in FIGS. 2 and 9. After the copy material has been securely positioned on the back panel 44, the back panel 44 is brought back to its vertical position against the front panel 40 and is locked in place by latch 52. When several film shots are required in which it is critical that all shots be made with a fine tolerance, the copyboard 28 is loaded through an opening 54. The copyboard 28 thus loaded with the copy material to be reproduced is then positioned by sliding movement on the rails 26 and is locked in position. The light reflectors 60 being properly positioned are turned on. The exact position of the copyboard 28 is determined by the size of the reproduced copies desired, as in case of enlargement or reduction, and is positioned with respect to the lens 14, also, adjustably positioned on the tracks 18.

The light image from the copy material to be reproduced is reflected through the lens 14 onto the film held by the film holder 64 facing the lens 14, or positioned in a plane parallel to the plane of the lens 14, when wrong reading image is desired. To produce a right reading image, the film holder 64 is set at 90° with respect to the vertical plane of the lens 14 and the light image of the copy material is reflected on the film in the film holder 66 from the light image reflector 78 also adjustably set at 45° angle, thereto, shown in FIG. 1.

When a copy is desired to be right reading, the lens 14 is moved on the separate tracks 18 to the rear and away from the copyboard 28, to be as close as possible to light image reflector 78 for maximum reduction. For maximum enlargement or right reading image or shot, the lens 14 is moved to its forward position. The lens 14 being mounted on a separate track 18 may, therefore, be used for fine focussing. Also the lens 14, the film holder 64 and the copyboard 28 being mounted on separate tracks and independent of each other provide the operator with full control in performing any shots desired. Various electrical accessories, such as master switch, plug in for lens shutter, timer, etc., of conventional type, are mounted on a control board for the convenience of the operator, and are not shown since they are well known in the art.

Furthermore, the film holder or platen 64 and the light image reflector 78 may be locked into a desired position by the interlocking means 90 so that both may be moved in unison by only moving the film holder 64 for reduced or enlarged shots in connection with right reading copies only. For wrong reading shots, however, the light image reflector 78 is not employed and, therefore, the film holder 64 is unlocked from the light reflector 78 and is set at its parallel position facing directly the lens 14 without the use of the light image reflector 78. According to this invention, therefore, the graphic arts camera 10 combines the operation of two cameras as one.

The preferred embodiment of the present invention has been described in the foregoing specification, however, it should be understood that the invention is intended to be protected herein is not limited by that which is shown in the drawing and described in the specification, but only as defined in the appended claims.

What I claim is:

1. A graphic arts camera for selectively producing right and wrong reading shots of a subject to be reproduced, comprising an overhead frame having a pair of parallel extending rails, a copyboard having a frame disposed in a vertical plane, roller means on said copyboard frame engaging said rails for traveling thereon, said copyboard having a pair of panels for holding subject copy pivotally mounted on said copyboard frame for swinging from a vertical plane shooting position to a horizontal plane loading position, light source means pivotally mounted on either side of said copyboard frame for illuminating subject on said copyboard, lens means disposed in a vertical plane in spaced relation to said copyboard for focussing a light image of subject copy on said copyboard, a film holder frame disposed in a vertical plane in spaced parallel relation to said lens means and said copyboard, said film holder frame having roller means engaging said overhead rails for traveling thereon for adjusting the space between said film holder frame and said lens means, a film holder pivotally mounted in a vertical axis on said film holder frame and being disposed in a vertical plane for swinging from a parallel wrong reading position to a vertical right reading position of 90° with respect to said copyboard, a carriage having roller means engaging said overhead rails for traveling thereon for adjusting the space between said carriage and said film holder, light image reflecting means pivotally mounted in a vertical axis on said carriage and being disposed in a vertical plane for being adjustably set from a parallel position to an angular position of 45° with respect to said film holder being angularly positioned at 90° for reflecting a light image from said lens means to said film holder when in the vertical right reading position thereby producing a right reading shot of the subject copy on said copyboard.

2. The combination of a graphic arts camera for producing right and wrong reading shots of a subject to be reproduced, including a copyboard, lens, and a film holder disposed in vertical planes spaced longitudinally in a parallel relation to each other supporting frame means having a pair of parallel tracks, said copyboard and film holder mounted on said frame means for traveling on said tracks, said film holder comprising a supporting frame having rollers for traveling on said tracks, said film holder pivotally mounted on a vertical axis on said supporting frame for swinging to an angular position of 90° thereto, a carriage having roller means mounted on said tracks for traveling thereon, and a light image reflector pivotally mounted in a vertical axis on said carriage for being angularly positioned at 45° with respect to said film holder for right reading shots.

3. The combination of a graphic arts camera as defined in claim 2, said film holder and said light image reflector being enclosed in a lightproof compartment, and interlocking means on said film holder and said light image reflector for movement in unison when adjustably being set angularly at 45° to each other for right reading shots.

4. The combination of a graphic arts camera as defined in claim 3, said copyboard being pivotally mounted for swinging from a vertical shooting position to a horizontal loading position, and vacuum means mounted on said film holder for automatically retaining a film when being loaded.

5. The combination of a graphic arts camera as defined in claim 4, said copyboard including a rectangular frame front and rear subject copy holding panels disposed in parallel planes and pivotally mounted on said frame for swinging from a horizontal loading position to a vertical shooting position, said rear panel being formed with an opening, and a drop down door hinged on said rear panel for said opening, whereby a subject copy may be placed on said copyboard through said opening for fine tolerance shots.

6. The combination of a graphic arts camera as defined in claim 5, and light source illuminating means pivotally mounted on each side of said copyboard for adjustably being positioned in the front and in the rear of said copyboard.

7. The combination of a graphic arts camera as defined in claim 4, said vacuum means including a vacuum pump mounted on a back door panel pivotally mounted on said film holder, a perforated front panel on said film holder, enclosure means between said perforated front panel and said vacuum pump, and control means for controlling the air pressure from said vacuum pump to said enclosure means.

8. A graphic arts camera for reproducing a subject matter comprising a copyboard, lens means, a film holder and a light image reflector spaced longitudinally in vertically disposed planes parallel to each other, said copyboard having a substantially rectangular frame, a pair of parallel panels pivotally mounted on said frame for holding a subject copy therebetween, one of said panels being formed with a substantially rectangular opening, a drop down door hingedly attached to said one of said panels for covering said opening for loading a subject on said copyboard through said opening for fine tolerance shots, said film holder being pivotally mounted for swinging from said parallel plane position to an angular position of 90° thereto, said film holder having a viewing glass panel pivotally mounted thereon, a back panel and front panel pivotally mounted on said film holder and vacuum means including a pump mounted on said back panel for retaining a film on said perforated when being loaded panel, control means on said film holder for controlling the air pressure through said perforated panel, said light image reflector being pivotally mounted on a vertical axis for being angularly positioned at 45° with respect to said film holder, and means interlocking said film holder and said light image reflector angularly with respect to each other for adjustably setting said film holder and said light image reflector in unison.

* * * * *